United States Patent
Driscoll, Jr. et al.

(10) Patent No.: US 6,341,044 B1
(45) Date of Patent: Jan. 22, 2002

(54) PANORAMIC IMAGING ARRANGEMENT

(75) Inventors: Edward C. Driscoll, Jr., Portola Valley; Edward P. Wallerstein, Pleasanton; Willard C. Lomax, Sunnyvale; James E. Parris, Pacifica; John Louis Warpakowski Furlan, Palo Alto; Edward V. Bacho, Sunnyvale; Jorge E. Carbo, Jr., Los Altos, all of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/175,157

(22) Filed: Oct. 19, 1998

Related U.S. Application Data

(63) Continuation-in-part of application No. 09/137,660, filed on Aug. 20, 1998, which is a continuation-in-part of application No. 08/872,525, filed on Jun. 11, 1997.
(60) Provisional application No. 60/020,292, filed on Jun. 24, 1996.

(51) Int. Cl.⁷ ............................ G02B 13/06; G02B 17/00
(52) U.S. Cl. ........................................ 359/725; 359/727
(58) Field of Search ........................ 359/725, 726–727, 359/364, 402–403, 458, 618; 348/36, 38–39

(56) References Cited

U.S. PATENT DOCUMENTS

| | | | |
|---|---|---|---|
| 2,146,662 A | 2/1939 | Van Albada | 359/423 |
| 2,176,554 A | * 10/1939 | Hardy | 359/504 |
| 2,244,235 A | 6/1941 | Ayres | 359/504 |
| 2,304,434 A | 12/1942 | Ayres | 355/46 |
| 2,628,529 A | 2/1953 | Braymer | 359/366 |
| 2,654,286 A | 10/1953 | Cesar | 359/448 |
| 3,203,328 A | 8/1965 | Brueggeman | 396/21 |
| 3,205,777 A | 9/1965 | Benner | 248/480 |
| 3,229,576 A | 1/1966 | Rees | 359/364 |

(List continued on next page.)

FOREIGN PATENT DOCUMENTS

| | | |
|---|---|---|
| FR | 1234341 | 5/1960 |
| GB | 2 221 118 A | 1/1990 |
| GB | 2289820 | 11/1995 |
| JP | 2-127877 | 11/1988 |

OTHER PUBLICATIONS

Deutsch, Cludia H., "One Camera That Offers Many Views". The New York Times v146, Feb. 3, 1997, pages 2.
Spice, Bryon, "Panospheric Cmaera Expands Horizon". Pittsburgh Post–Gazette, Jun. 2, 1997, Pages:03.
Heckbert, P., "Survey of Texture Mapping" IEEE CG&A, Nov. 1986, pp. 56–67.
Defendants IPI's Notice of Reliance of Prior Art and Witnesses, Civil Action of Interactive Pictures Corporation, A/K/A Omniview, Inc. v. Infinite Pictures, Inc. and Bill Tllman, Case No. 3–96–849; 05 Pages. Filed: Dec. 8, 1997, in U.S.D.C., Eastern District of Tennessee.
Defendant IPI's Compsit Exhibit List, Civil Action of interactive Pictures Corporation, F/K/A Omniview, Inc. v. Infinite Pictures, Inc. and Bill Tillman, Case No. 3–96–849. Filed: Jan. 5, 1998, in W.S.D.C., Eastern District of Tennessee. Pages: 20.

(List continued on next page.)

*Primary Examiner*—Jordan M. Schwartz
(74) *Attorney, Agent, or Firm*—Daniel B. Curtis; Dag H. Johansen

(57) ABSTRACT

According to one aspect of the invention there is provided a panoramic imaging arrangement comprising lens block and a system of lenses. The lens block has a substantially vertical axis of revolution and is capable of receiving light from a first, 360° surrounding panoramic scene. The system of lenses has a vertical axis of revolution substantially coinciding with the axis of revolution of the lens block and is positioned to receive light from a second scene which is at least partially located above the first, surrounding panoramic scene, and projecting the light from the second scene.

20 Claims, 5 Drawing Sheets

U.S. PATENT DOCUMENTS

| | | | |
|---|---|---|---|
| 3,692,934 A | 9/1972 | Herndon | 348/36 |
| 3,723,805 A | 3/1973 | Scarpino et al. | 315/370 |
| 3,785,715 A | 1/1974 | Mecklenborg | 359/631 |
| 3,832,046 A | 8/1974 | Mecklenborg | 352/69 |
| 3,846,809 A | 11/1974 | Pinzone et al. | 354/95 |
| 3,872,238 A | 3/1975 | Herndon | 178/6 |
| 3,934,259 A | 1/1976 | Krider | 354/194 |
| 3,998,532 A | 12/1976 | Dykes | 352/69 |
| 4,012,126 A | 3/1977 | Rosendahl et al. | 359/725 |
| 4,017,145 A | 4/1977 | Jerie | 359/220 |
| 4,038,670 A | 7/1977 | Seitz | 354/96 |
| 4,058,831 A | 11/1977 | Smith | 358/87 |
| 4,078,860 A | 3/1978 | Globus et al. | 352/69 |
| 4,157,218 A | 6/1979 | Gordon et al. | 354/66 |
| 4,190,866 A | 2/1980 | Lukner | 358/229 |
| 4,241,985 A | 12/1980 | Globus et al. | 354/99 |
| D263,716 S | 4/1982 | Globus et al. | D16/1 |
| 4,326,775 A | 4/1982 | King | 359/725 |
| 4,395,093 A | 7/1983 | Rosendahl et al. | 359/725 |
| 4,429,957 A | 2/1984 | King | 359/676 |
| 4,463,380 A | 7/1984 | Hooks, Jr. | 358/160 |
| 4,484,801 A | 11/1984 | Cox | 359/725 |
| 4,518,898 A | 5/1985 | Tarnowski et al. | 315/371 |
| 4,549,208 A | 10/1985 | Kamejima et al. | 358/108 |
| 4,561,733 A | 12/1985 | Kreischer | 359/856 |
| 4,566,763 A | 1/1986 | Greguss | 359/725 |
| 4,578,682 A | 3/1986 | Hooper et al. | 343/916 |
| 4,593,982 A | 6/1986 | Rosset | 354/99 |
| 4,602,857 A | 7/1986 | Woltz et al. | 352/84 |
| 4,656,506 A | 4/1987 | Ritchey | 358/87 |
| 4,661,855 A | 4/1987 | Gulck | 358/225 |
| 4,670,648 A | 6/1987 | Hall et al. | 250/216 |
| 4,728,839 A | 3/1988 | Coughlan et al. | 310/112 |
| 4,736,436 A | 4/1988 | Yasukawa et al. | 382/154 |
| 4,742,390 A | 5/1988 | Francke et al. | 358/108 |
| 4,751,660 A | 6/1988 | Hedley | 364/518 |
| 4,754,269 A | 6/1988 | Kishi et al. | 340/729 |
| 4,761,641 A | 8/1988 | Schreiber | 340/717 |
| 4,772,942 A | 9/1988 | Tuck | 358/87 |
| 4,797,942 A | 1/1989 | Burt et al. | 382/41 |
| 4,807,158 A | 2/1989 | Blanton et al. | 364/521 |
| 4,835,532 A | 5/1989 | Fant | 340/728 |
| 4,858,002 A | 8/1989 | Zobel | 358/98 |
| 4,858,149 A | 8/1989 | Quarendon | 364/522 |
| 4,864,335 A | 9/1989 | Corrales | 354/99 |
| 4,868,682 A | 9/1989 | Shimizu et al. | 358/335 |
| 4,899,293 A | 2/1990 | Dawson et al. | 364/521 |
| 4,901,140 A | 2/1990 | Lang et al. | 358/64 |
| 4,907,084 A | 3/1990 | Nagafusa | 358/171 |
| 4,908,874 A | 3/1990 | Gabriel | 382/41 |
| 4,918,473 A | 4/1990 | Blackshear | 354/81 |
| 4,924,094 A | 5/1990 | Moore | 250/334 |
| 4,943,821 A | 7/1990 | Gelphman et al. | 354/94 |
| 4,943,851 A | 7/1990 | Lang et al. | 358/87 |
| 4,945,367 A | 7/1990 | Blackshear | 354/81 |
| 4,965,844 A | 10/1990 | Oka et al. | 382/44 |
| D312,263 S | 11/1990 | Charles | D16/203 |
| 4,974,072 A | 11/1990 | Hasegawa | 358/80 |
| 4,985,762 A | 1/1991 | Smith | 358/87 |
| 4,991,020 A | 2/1991 | Zwirn | 358/160 |
| 5,005,083 A | 4/1991 | Grage et al. | 358/181 |
| 5,020,114 A | 5/1991 | Fujioka et al. | 382/44 |
| 5,021,813 A | 6/1991 | Corrales | |
| 5,023,725 A | 6/1991 | McCutchen | 358/231 |
| 5,038,225 A | 8/1991 | Maeshima | 358/461 |
| 5,040,055 A | 8/1991 | Smith | 358/87 |
| 5,048,102 A | 9/1991 | Tararine | 382/41 |
| 5,067,019 A | 11/1991 | Juday et al. | 358/160 |
| 5,068,735 A | 11/1991 | Tuchiya et al. | 358/209 |
| 5,077,609 A | 12/1991 | Manephe | 358/109 |
| 5,083,389 A | 1/1992 | Alperin | 40/539 |
| 5,097,325 A | 3/1992 | Dill | 358/87 |
| 5,115,266 A | 5/1992 | Troje | 354/95 |
| 5,130,794 A | 7/1992 | Ritchey | 358/87 |
| 5,142,354 A | 8/1992 | Suzuki et al. | 358/34 |
| 5,153,716 A | 10/1992 | Smith | 358/87 |
| 5,157,491 A | 10/1992 | Kassatly | 358/146 |
| 5,166,878 A | 11/1992 | Poelstra | 364/424.01 |
| 5,173,948 A | 12/1992 | Blackham et al. | 382/44 |
| 5,175,808 A | 12/1992 | Sayre | 395/133 |
| 5,185,667 A | 2/1993 | Zimmermann | 358/209 |
| 5,187,571 A | 2/1993 | Braun et al. | 358/85 |
| 5,189,528 A | 2/1993 | Takashime et al. | 358/448 |
| 5,200,818 A | 4/1993 | Neta et al. | 358/87 |
| 5,231,673 A | 7/1993 | Elenga | 382/6 |
| 5,259,584 A | 11/1993 | Wainright | 248/542 |
| 5,262,582 A | 11/1993 | Eouzan et al. | 358/87 |
| 5,262,867 A | 11/1993 | Kojima | 358/209 |
| 5,280,540 A | 1/1994 | Addeo et al. | 379/54 |
| 5,289,312 A | 2/1994 | Hashimoto et al. | 359/487 |
| 5,305,035 A | 4/1994 | Schonherr et al. | 354/96 |
| 5,311,572 A | 5/1994 | Freides et al. | 379/67 |
| 5,313,306 A | 5/1994 | Kuban et al. | 348/65 |
| 5,315,331 A | 5/1994 | Ohshita | 354/94 |
| 5,341,218 A | 8/1994 | Kaneko et al. | 348/695 |
| 5,359,363 A | 10/1994 | Kuban et al. | 348/36 |
| 5,384,588 A | 1/1995 | Martin et al. | 348/15 |
| 5,396,583 A | 3/1995 | Chen et al. | 395/127 |
| 5,422,987 A | 6/1995 | Yamada | 395/127 |
| 5,432,871 A | 7/1995 | Novik | 382/232 |
| 5,444,476 A | 8/1995 | Conway | 348/15 |
| 5,446,833 A | 8/1995 | Miller et al. | 395/125 |
| 5,452,450 A | 9/1995 | Delory | 395/600 |
| 5,473,474 A | 12/1995 | Powell | 359/725 |
| 5,479,203 A | 12/1995 | Kawai et al. | 348/15 |
| 5,490,239 A | 2/1996 | Myers | 395/129 |
| 5,495,576 A | 2/1996 | Ritchey | 395/125 |
| 5,508,734 A | 4/1996 | Baker et al. | 348/36 |
| 5,530,650 A | 6/1996 | Bifero et al. | 364/460 |
| 5,539,483 A | 7/1996 | Nalwa | 353/94 |
| 5,550,646 A | 8/1996 | Hassen et al. | 358/442 |
| 5,563,650 A | 10/1996 | Poelstra | 348/36 |
| 5,601,353 A | 2/1997 | Naimark et al. | 353/122 |
| 5,606,365 A | 2/1997 | Maurinus et al. | 348/222 |
| 5,610,391 A | 3/1997 | Ringlien | 250/223 B |
| 5,612,533 A | 3/1997 | Judd et al. | 250/208.1 |
| 5,627,675 A | 5/1997 | Davis et al. | 359/366 |
| 5,631,778 A | 5/1997 | Powell | 359/724 |
| 5,633,924 A | 5/1997 | Kaish et al. | 379/266 |
| 5,649,032 A | 7/1997 | Burt et al. | 382/284 |
| 5,682,511 A | 10/1997 | Sposato et al. | 395/353 |
| 5,686,957 A | 11/1997 | Baker et al. | 348/36 |
| 5,710,661 A * | 1/1998 | Cook | 359/364 |
| 5,714,997 A | 2/1998 | Anderson et al. | 348/39 |
| 5,729,471 A | 3/1998 | Jain et al. | 364/514 A |
| 5,748,194 A | 5/1998 | Chen | 345/427 |
| 5,760,826 A | 6/1998 | Nayer | 348/36 |
| 5,761,416 A | 6/1998 | Mandet et al. | 395/200.8 |
| 5,764,276 A | 6/1998 | Martin et al. | 348/13 |
| 5,796,426 A | 8/1998 | Gullichsen et al. | 348/207 |
| 5,841,589 A | 11/1998 | Davis et al. | 359/726 |
| 5,844,520 A | 12/1998 | Guppy et al. | 342/177 |
| 5,850,352 A | 12/1998 | Moezzi et al. | 364/514 A |
| 5,854,713 A | 12/1998 | Kuroda et al. | 359/850 |
| 5,877,801 A | 3/1999 | Martin et al. | 348/36 |
| RE36,207 E | 5/1999 | Zimmermann et al. | 348/207 |
| 5,903,319 A | 5/1999 | Busko et al. | 348/607 |
| 5,920,337 A | 7/1999 | Glassman et al. | 348/36 |
| 5,990,941 A | 11/1999 | Jackson et al. | 348/207 |
| 6,002,430 A | 12/1999 | McCall et al. | 348/207 |
| 6,028,719 A * | 2/2000 | Beckstead et al. | 359/725 |

| | | | |
|---|---|---|---|
| 6,034,716 A | 3/2000 | Whiting et al. | 348/36 |
| 6,043,837 A | 3/2000 | Driscoll, Jr. et al. | 348/36 |

OTHER PUBLICATIONS

Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tennessee.

Plantiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 2, 1998, in U.S.D.C., Eastern District of Tennessee.

Ripley G. David, "DVI–A Digital Multimedia Technology". Communication of the ACM. Jul 1989. vol. 32. No. 07. pp. 811–820.

CNOE M. and KUNO Y., "Digital Processing CF Images Taken By Fish–Eye Lens". 1982. IEEE. pp. 105–108.

Hamit, F., "Near–Fisheye CCD Camera Broadens View for Imaging". Advanced Imaging. Mar. 1993. pp. 50–52.

Dixon, D., Gonlin, S., and Hasfield, I., "DVI Video/Graphics". Computer Graphics World reprinted from the Jul. 1987 edition of Computer Grpahics World. p. 4.

Upstill, Steve. "Building Stronger Images". UNIX Review. Oct. 1988. vol. 06. No. 10. pp. 63–73.

Greene, N., "Environment Mapping and Other Applications of the World Projections." Computer Graphics and Applications. Nov. 1986. IEEE Computer Society. vol. 06, No. 11. pp. 21–29.

Hechbert P., "The PMAT and Poly User's Manual". Computer Graphics Lab. N.Y.I.T., Feb. 18, 1983. pp. 1–29.

Heckbert, P., Fundamentals of Textured Mapping and Image Warping. Master Thesis. p. 86. Dated: Jun. 17, 1989.

Rebiai,M., Mansouri,S., Pinson,F., and Tichit, B., "Image Distortion From Zoom Lenses: Modeling and Digital Correction". International Brodcasting Convention. IEEE. Dated: Jul. 1992.

Charles Jeffery, R., "All–Sky Reflector with "Invisible" Camera Support". Images from 1988 RTMC Proceedings. pp. 79–80.

Roger W. Sinnott, "Scientific Library Gleaning for ATMs". Sky & Telescope. Aug. 1986. p. 186.

Charles et al., "How to Build and Use an All–Sky Camera." Astronomy. Apr. 1987. pp. 64–70.

Johnson, Colin R., "Imaging System Sees All". Electronic Engineering Times. Dec. 25, 1996. pp. 1&98.

Castleman, K., "Digital Image Processing". Prentice Hall. 1979. pp. 110–135, 383–400, 408.

Castleman, K., "Digital Image Processing". Prentice Hall. 1996. pp. 125–127, 140–141.

Shah, S., A Simple Calibration Procedure For Fish–Eye (High Distortion) Lens. IEEE. 1994. pp. 3422–3427.

"Gnomonic Projection". Map Projections–A Working Manual. pp. 164–168, 1987.

Greene, N., and Heckbert, P., "Creating Raster Omnimax Images From Multiple Perspective Views Using The Elliptical Weighted Average Filter". IEEE. 1986. pp. 21–27.

Fant, K., "A Nonaliasing, Real–Time Spatial Formation Technique". IEEE. 1986. pp. 71–80.

Greene, William B., "Qualitative Image Processing Techniques". Digital Image Processing, A Systems Approach. $2^{nd}$ Edition. 1989. Van Nostrand Reinhold. pp. 92–112.

Wolberg, George. Digital Image Warping (Introduction). 1990. IEEE Computer Society Press. p. 2.

Fu, K.S. et al., "Low–Level Vision". Robotics: Control, Sensing, Vision, and Intelligence. 1987.McGraw Hill Inc., pp. 313–315.

Carlbom, Ingrid et al. "Planner Geometric Projections and Viewing Transformations". Computing Surveys. vol. 10. No. 04. Dec. 1978. pp. 465–502.

Anderson, R.L., et al., "Omnidirectional Real time Imaging Using Digital Restoration". High Speed Photography SPIE. vol. 348. San Diego, CA. 1982. pp. 807–814.

Laikin, Milton. "Wide Angle Lens System". 1980. International Design Conference (OSA). SPIE. vol. 237. 1980. pp. 530–532, 815–816.

Shah, Shisir et al., "Depth Estimation using Fish–Eye Lenses". IEEE. Department Of Electrical and Computer Engineering. University of Texas. 1994. pp. 740–744.

Tsai, Roger Y., "A Versatile Camera Calibration Technique for High Accuracy 3–D Machine Vision Using Off–the–Shelf TV Cameras and Lenses". IEEE. Journal of Robotics and Automation. vol. RA–3. No. 04. Aug. 1987. pp. 323–344.

Chang, Yuh–Lin et al., "Calibrating a Mobile Camera's Parameters". Pattern Recognition. vol. 26, No. 1. Dated: 1983. pp. 75–88.

Weng, Juyang. "Camera Calibration With Distortion Models and Accuracy". IEEE. Transactions On Pattern Analysis and Machine Intelligence. vol. 14. No. 10. Oct. 1992. pp. 965–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp. 713–720.

Nomura, Yoshihiko, et al., "A Simple Calibration Algorithm for High–Distortion Lens Cameras". IEEE. Transaction on Pattern Analysis and Intelligence Machine. vol. 14. No. 11. Nov. 1992. pp. 1095–1099.

International Broadcasting Convention Venue RAI Congress And Exhibition Centre, Amersterdam, The Netherlands. Jul. 3–7, 1992. p. 06, Including the title page.

Miyamoto, K., "Fish Eye Lens". JOSA. vol. 54. pp. 1060–1061. Dated: Aug. 1964.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 05, 1998 in U.S.D.C., Eastern District Of Tennessee. Pages: 20.

Baltes, M. "Bevet D'Intervention". Ref. No.:N1.234.341, 1959.

Verity, John W. (edited by): Information Processing. Business Week. p. 134E. Dated: Jul. 13, 1992.

Marbach, William D. (edited by): Developments To Watch. Business Week. p. 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp. 36–37. Dated: Sep. 1992.

Tulloch, Martha. "New Video Cameras . . . " Photonics Spectra. pp. 18–20. Dated: Oct. 1992.

Fisher, Timothy E., A Programmable Video Image Remapper. SPIE> vol. 938. pp. 122–128. Dated: 1988.

Lippman, Andrew. Movie–Map: An Application Of The Optical Videodisc To Computer Graphics. pp. 43. Dated: 1980.

Yelick, Steven. Anamorphic Image Processing. pp. 1–37, Including Acknowledgement Page. Dated: 1980.

* cited by examiner

PANORAMIC IMAGING ARRANGEMENT

This patent application is a continuation-in-part of U.S. patent application Ser. No. 09/137,660 filed Aug. 20, 1998 (pending) which is a continuation-in-part of U.S. patent application Ser. No. 08/872,525 filed Jun. 11, 1997 (pending) which claims priority from U.S. Provisional Patent Application Serial No. 60/020,292 filed Jun. 24, 1996.

BACKGROUND OF THE INVENTION

1). Field of the Invention

This invention relates to a panoramic imaging arrangement of the kind capable of capturing, focusing, correcting aberrations and otherwise manipulating light received from a 360° surrounding panoramic scene, and to a method of capturing a 360° surrounding panoramic scene.

2). Discussion of Related Art

Panoramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertically extending axis of revolution, which are used to refract or reflect light received from a 360° surrounding panoramic scene. The lenses alter the direction of the light, whereafter the light passes through a series of lenses which are located vertically one above the other and which further manipulate the light by, for example, focusing the light or altering the intensity of the light.

The task of receiving light in a sideways direction and altering the direction of the light so that the light then proceeds in a vertical direction is a difficult one. Altering the direction of light to such a degree, especially when coming from a 360° surrounding scene, oftentimes leads to aberrations in the resulting light. These aberrations may include astigmatism of the light, defects in color of the light, a loss of image plane flatness, and other defects, some of which are discussed in more detail herein below.

Relatively complex lenses and lens arrangements have been developed in order to overcome these aberrations. Some of these lenses have surfaces which are aspherical (see for example U.S. Pat. No. 5,473,474 issued to Powell). Aspherical lenses are difficult to manufacture and therefore less practical to manufacture than for example spherical lenses.

One reason why aberrations in light occur is due to the use of refractive lenses instead of reflective lenses. The use of refractive lenses results in aberrations in color of the resulting light, whereas the use of reflective, or mirror lenses does not result in, or cause minimal aberrations in color of the light reflected from them. One reason for the lack of the use of reflective lenses, on the other hand, is that reflective lenses, when exposed to the environment, degrade through time, resulting in loss of image.

These and other aberrations in light are more prominent when light is received from a panoramic view at a relatively large lateral included angle, particularly if the included angle, in a vertical plane, is larger than 90° and especially if the included angle extends from an angle below the horizon to an angle above the horizon, i.e. covering substantially more than a hemisphere.

Another problem with typical panoramic imaging arrangements is that they only allow for capturing of a view in narrow lateral angle. It may therefore be advantageous also to capture a scene, perhaps of the sky, located above the field of view captured by typical panoramic imaging arrangements.

SUMMARY OF THE INVENTION

According to one aspect of the invention there is provided a panoramic imaging arrangement comprising lens block and a system of lenses. The lens block has a substantially vertical axis of revolution and is capable of receiving light from a first, 360° surrounding panoramic scene. The system of lenses has a vertical axis of revolution substantially coinciding with the axis of revolution of the lens block and is positioned to receive light from a second scene which is at least partially located above the first, surrounding panoramic scene, and projecting the light from the second scene.

The lens block is typically a refractive lens and may have a convex lower surface through which light from the first, surrounding panoramic scene enters the lens block.

The lens block may have a convex upper reflective surface from which light from the first, surrounding panoramic scene is downwardly reflected. An opening may be formed in the convex upper reflective surface through which light from the second scene may pass after leaving the system of lenses.

Light from the second scene may pass through the lens block after leaving the second lens.

The lens block preferably receives light from the first, surrounding panoramic scene for an unbroken included angle, in a plane of the axis of revolution, which preferably is at least 60°, and more preferably at least 90.

The system of lenses may receive light from the second scene for an unbroken included angle, in a plane of the axis of revolution, which is preferably at least 60° and more preferably at least 80°.

Preferably, the lens block receives light from the first, surrounding panoramic scene for an unbroken included angle, in a plane of the axis of revolution, and the system of lenses receives light from the second scene for an unbroken included angle, in the plane of the axis of revolution, wherein twice the unbroken included angle received by the lens block and the unbroken included angle received by the system of lenses amount to at least 220°.

The panoramic imaging arrangement preferably further includes at least one additional set of lenses through which light from both the first, surrounding panoramic scene and light from the second scene passes after leaving the lens block and the system of lenses respectively.

The panoramic imaging arrangement may further include image capturing apparatus positioned to receive light from both the first, surrounding panoramic scene and from the second scene after passing through the additional set of lenses.

BRIEF DESCRIPTION OF THE DRAWINGS

The invention is further described by way of examples with reference to the accompanying drawings wherein.

DESCRIPTION OF PREFERRED EMBODIMENTS

Figure 1:
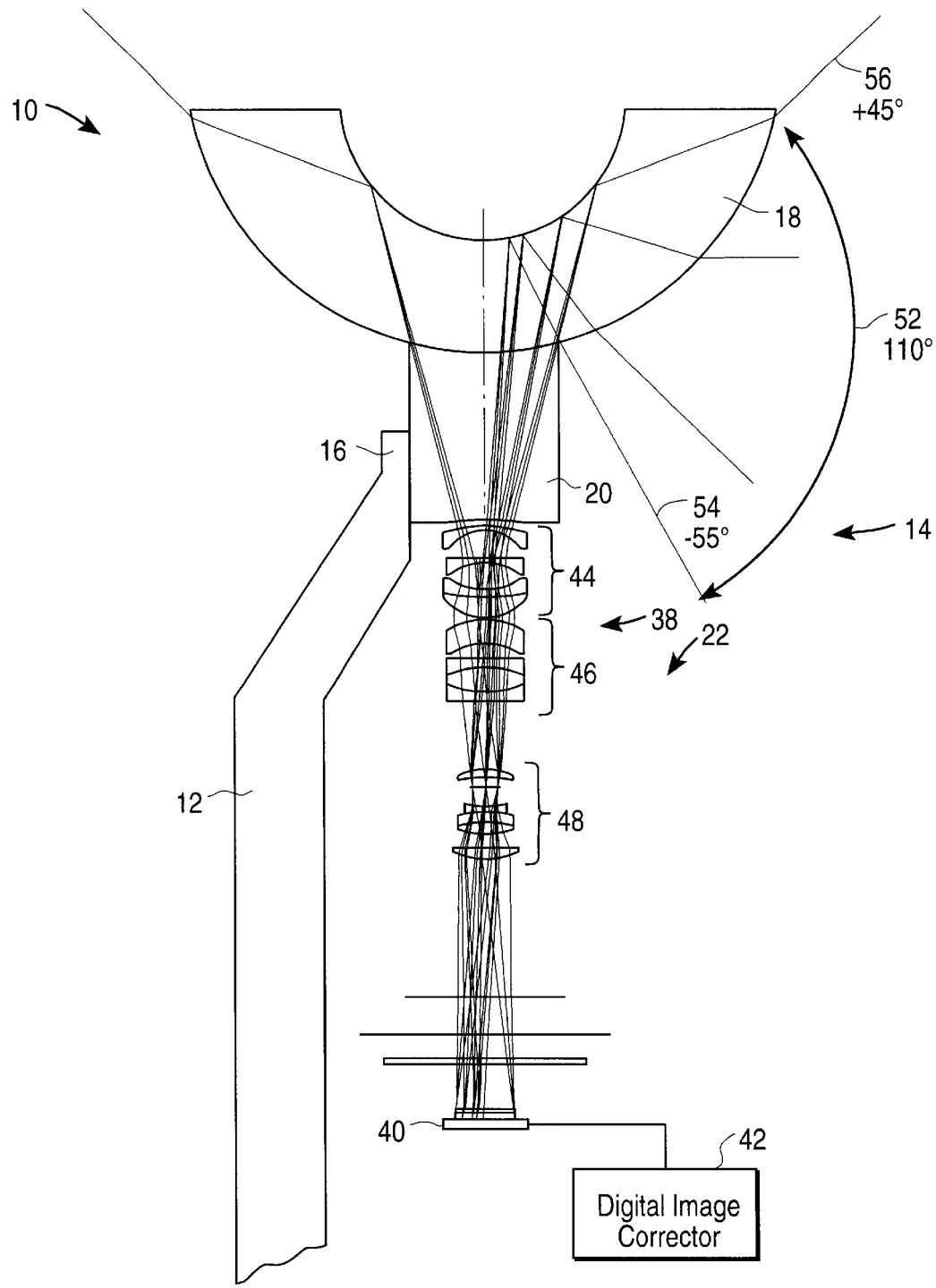
FIG. 1 is a side view illustrating apparatus, according to an embodiment of the invention, for capturing in a panoramic scene.

FIG. 1 of the accompanying drawings illustrates apparatus 10, according to an embodiment of the invention, for capturing a panoramic scene. The apparatus 10 includes a vertically extending support structure 12, and a panoramic imaging arrangement 14 which is secured to an upper end 16 of the support structure 12.

The support structure 12 may be any device having an upper end 16 which is high enough for purposes of providing a viewpoint of a panoramic scene. The support structure 12 is typically part of a housing for the panoramic imaging arrangement 14 and may, for example, include a vertically extending post, a tripod stand, or part of building structure.

The panoramic imaging arrangement 14 includes a first, upper lens block 18, a second, lower lens block 20, and apparatus 22, positioned below the second lens block 20, for manipulating light so as to correct certain aberrations of the light and to focus the light (hereinafter generally referred to as the "light manipulation apparatus 22").

Figure 2:
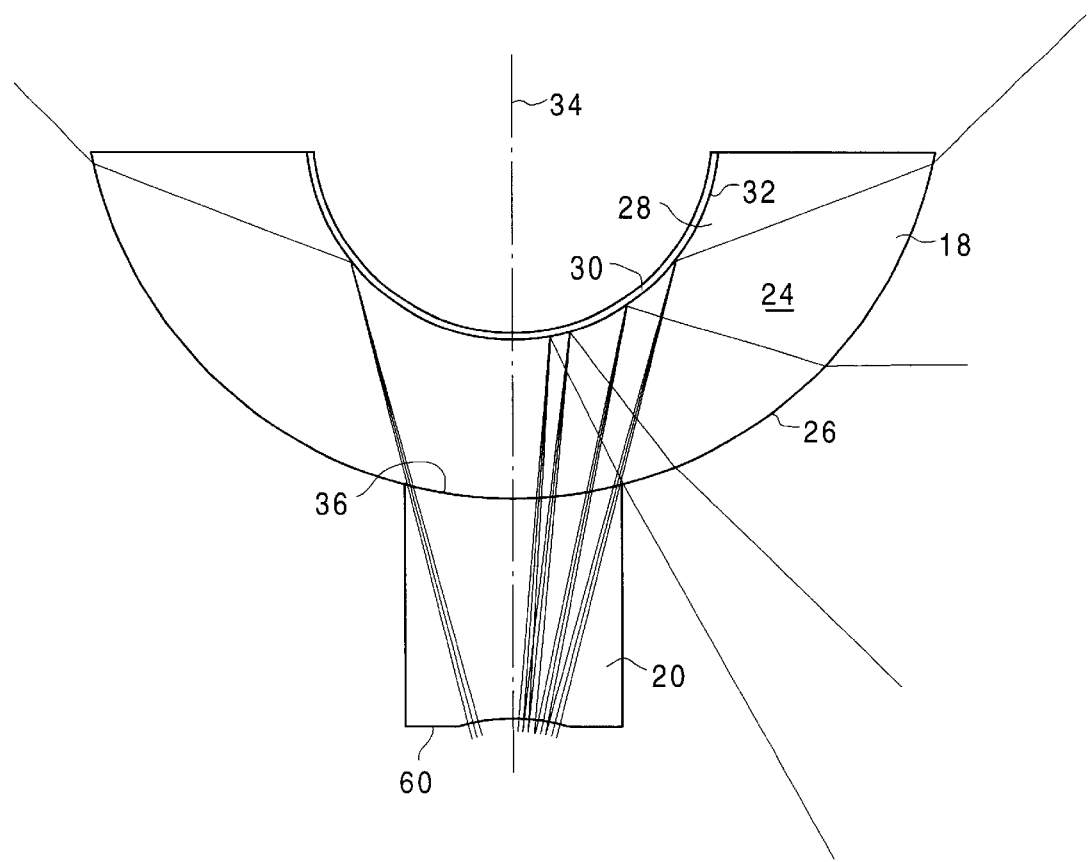
FIG. 2 is an enlarged view of first and second lens blocks forming part of the apparatus of FIG. 1.

FIG. 2 is an enlarged view of the first and second lens blocks 18 and 20.

The first lens block 18 includes a transparent component or refractive lens 24 which has a substantially spherical convex outer and lower surface 26, and a substantially spherical concave inner and upper surface 28. Center points of the convex outer surface 26 and the concave inner surface 28 of the transparent lens 24 substantially coincide with one another.

The concave inner surface 28 is covered with a thin layer of reflective material 30. After the reflective material 30 is deposited, a substantially spherical convex reflective surface 32 (sometimes generally referred to herein as a "convex reflective lens") is provided against the transparent lens 24. The transparent lens 24 so covers the convex reflective surface 32, thereby providing a shield protecting the convex reflective surface 32 against environmental conditions which may otherwise cause damage to the convex reflective surface 32.

The convex outer surface 26 of the transparent lens 24 and the convex reflective surface 32 have a common, substantially vertical axis of revolution 34.

The second lens block 20 is made out of cylindrical transparent material. An upper end 36 of the second lens block 20 has a substantially spherical concave surface which conforms with the convex outer surface 26 of the transparent lens 24.

The transparent lens 24 and the second lens block 20 are secured to one another be means of a transparent optical cement (not shown) which is located between the upper end 36 of the second lens block 20 and the convex outer surface 26 of the transparent lens 24. Transparent optical cements of the above kind are known in the art.

Referring again to FIG. 1, the light manipulation apparatus 22 includes a system of lenses 38, image capturing apparatus 40, and a digital image corrector 42.

The system of lenses 38 includes a first set of lenses 44, a second set of lenses 46, and a third set of lenses 48. The lenses work together to correct aberrations of light. Generally speaking the first set of lenses 44 is designed and configured to reduce astigmatism, the second set of lenses 46 for doing color correction, and the third set lenses 48 for creating an image of suitable scale and for fine-tuning certain other system aberrations as will further be discussed herein. One skilled in the art of optics will appreciate that the respective sets of lenses 44, 46, and 48 are of conventional kind although their collective effect may be unique in completing the present embodiment. Further details of such lenses may be found in a handbook on modern optics such as in "Modern Optical Engineering" by Warren J. Smith (McGraw Hill, Inc.; 1990).

The panoramic imaging arrangement 14 is secured to the upper end 16 of the support structure 12 by mounting the second lens block 20 directly to the upper end 16 of the support structure 12. No metal or other components are therefore secured to the first lens block 18.

In use, light is received laterally from a 360° panoramic scene surrounding the first lens block 18 (see FIG. 2). Light from the panoramic scene enters the convex outer surface 26 of the transparent lens 24 of the first lens block 18 for an inbroken and continuous included angle 52 located in a vertical plane. The included angle 52 is about 110° covering more than a hemisphere and extends from an angle 54 which is about 55° below the horizon to an angle 56 which about 45° above the horizon. (The included angle 52 is therefore at least 60° and preferably at least 90°, and the angles 54 and 56 below and above the horizon are each therefore at least 30° below and above the horizon.)

It should be noted that the lens blocks 18 and 20 are mounted to the support structure 12 so that light from the panoramic scene is capable of passing over the upper end 16 of the support structure 12, i.e., without the support structure obscuring light from the panoramic scene.

Light from the panoramic scene is refracted slightly upwardly when entering the transparent lens 24. The light then travels through the transparent lens 24 and is reflected downwardly from the convex reflective surface 32. The light then passes downwardly through the transparent lens 24 and exits the transparent lens 24 downwardly through the convex outer surface 26.

The light then passes through the transparent optical cement located between the first and second lens blocks 18 and 20, whereafter the light enters the second lens block 20 through the upper end 36 thereof. The second lens block 20 has a diameter which is sufficiently wide so that light from the entire included angle 52, after being reflected by the convex reflective surface 32, enters the second lens block 20 thorough its upper end 36. The light then travels through the second lens block 20 and exits the second lens block through a lower end 60 thereof. Although not shown in particular detail in the figures, the cylindrical outer surface of the second lens block 20 is typically covered to prevent light from entering into the second lens block 20 in a sideways direction. This may be accomplished with the upper end 16 of the support structure shown in FIG. 2.

Should an attempt be made to focus the light after leaving the second lens block 20, certain aberrations would be noticed. These aberrations include astigmatism, abnormality in color, lack of image plane flatness, and a value of f-theta which is less than 1. The value f-theta is indicative of how much compression of view occurs in a vertical direction of an image view, resulting in more vertical compression in one area of the image view than in another area of the image view. Values of f-theta are expressed as fractions of 1 so that a value of f-theta approaching 1 would be indicative of more uniform compression, and a value of f-theta which is a smaller fraction of 1 would be indicative of more non-uniform compression.

A number of factors, alone and in combination, contribute to these aberrations, including the relatively large width of the included angle 52, the relatively large inclination of the angle 54 below the horizon, the relatively high inclination of the angle 56 above the horizon, and the particular choice of lenses, including the choice of a substantially spherical convex outer surface 26 of the transparent lens 24, and the substantially spherical convex reflective surface 32. These aberrations occur even though a reflective surface 32 is used which causes less aberrations in color than a refractive surface would and even though the transparent lens 24 has a convex outer surface 26 which assist greatly in reducing aberrations.

The light manipulation apparatus 22 (see FIG. 1), however, functions to correct or at least to reduce these aberrations.

In particular, the first set of lenses 44 is positioned so that light from the second lens block 20 passes through the first set of lenses 44. The first set of lenses 44 then generally corrects or at least reduces astigmatism of the light to an acceptable level.

The second set of lenses 46 is positioned to receive the light, after passing through the first set of lenses 44, and generally functions so as to do color correction of the light.

The third set of lenses 48 is positioned to receive light, after passing through the second set of lenses 46, and generally functions to reduce the effect of compression so that the value f-theta is adjusted closer to 1, typically to a value above 0.5. The third set of lenses 48 also functions to flatten the image plane and focus the image on the image capturing apparatus 40.

The image capturing apparatus 40 may, for example, be a digital detection array capable of capturing the image projected by the panoramic imaging arrangement 14. Certain aberrations may still exist, even after the light passes through the system of lenses 38. For example, the value of f-theta, although adjusted to be closer to 1, may still be somewhat below 1.

The digital image corrector 42 is coupled to the image capturing apparatus so as to receive the image captured by the image capturing apparatus 40. The digital image corrector 42 is capable of adjusting the image so as to correct for certain, still existing aberrations. For example, the digital image corrector 42 may adjust f-theta so as to be closer or substantially equal to 1. One skilled in the art would appreciate that the digital image corrector 42 typically has a processor and memory with an executable program which corrects the aberrations in the light referred to.

As mentioned previously, one unique feature is that a substantially spherical convex reflective surface 32 is used which is protected from environmental conditions which may otherwise result in damage to the reflective surface 32. Reflective lenses generally have the advantage that they reflect light with little or no aberrations in color of the reflected light and convex reflective lenses have the added advantage that they require less power than, for example, concave reflective lenses.

It should also be evident from the aforegoing description that another advantage is that the panoramic imaging arrangement 14 can be mounted to the support structure 12 in a manner wherein the support structure 12 does not obscure light from a panoramic view from reaching the first lens block 18.

A further advantage of the invention is that lenses having substantially spherical surfaces are used. Spherical surfaces are easier to manufacture than paraboloidal, hyperboloidal, ellipsoidal or other aspheric surfaces and are therefore less expensive to manufacture.

Yet a further advantage is that a relatively large included angle 52 can be received which extends from a relatively large angle 54 below the horizon to a relatively large angle 56 above the horizon.

Although spherical surfaces are used, at least one of which having a reflective surface, and regardless of the choice of angles 52, 54, and 56, a final image is created which is corrected for astigmatism and color, which is flattened, and in which the value of f-theta is controlled.

Figure 3:
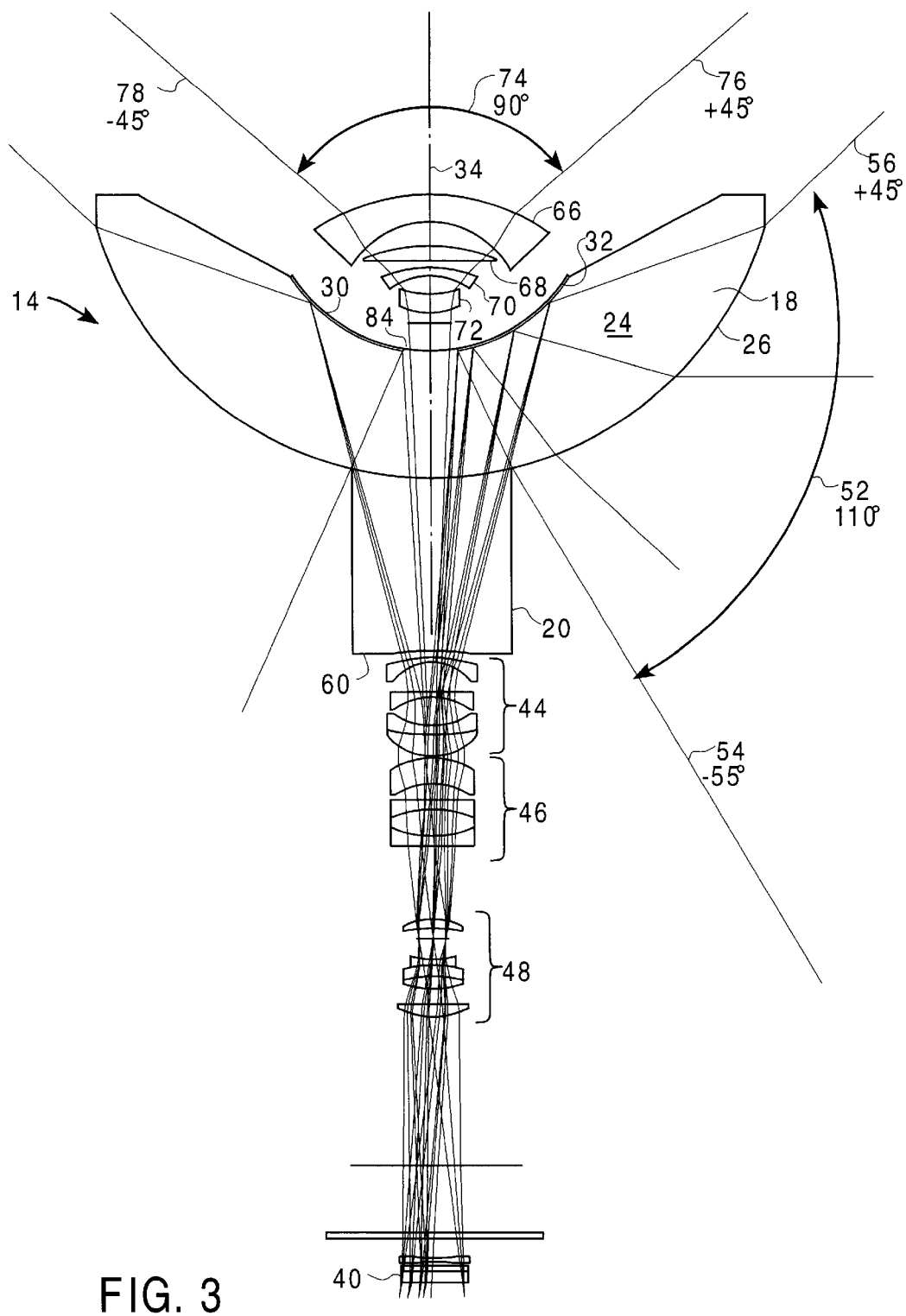
FIG. 3 is a side view of a panoramic imaging arrangement forming part of the apparatus for capturing the panoramic scene of FIG. 1, which is complemented by a system of lenses positioned to receive light from a second scene which is located above the panoramic scene.

It can be seen from FIG. 1 that the upper lens block 18 is capable of receiving light directly from a surrounding panoramic scene up to an angle 56 which is about 45° above the horizon. The upper lens block 18 therefore has a "blind spot" of about 90° located above the angle 56. The first lens block 18 is therefore capable of receiving light from the first, 360° surrounding panoramic scene but is unable to receive light from a second scene, perhaps the sky, which is located above the panoramic scene. FIG. 3 is a sectioned side view of the panoramic imaging arrangement 14 wherein the upper lens block 18 is complemented by a system of lenses 66, 68, 70 and 72 located above the upper lens block 18 and each having a vertical axis of revolution which substantially coincides with the axis of revolution 34 of the convex outer surface 26 and the convex reflective surface 32.

The lens 66 is located above the lenses 68, 70 and 72 and is positioned to receive light directly from the second scene which is located above the panoramic scene. The lens 66 receives light from the second scene for an unbroken included angle 74, located in a plane of the axis of revolution 34, of about 90° extending from an angle 76 which is located about 45° below vertical, over vertical, to an angle 78 on an opposing side of about 45° below vertical. The lens 66 therefore receives light from the blind spot of the upper lens block 18. The total included angle of light received by the first lens block 18 and the lens 66 is therefore 310° (twice in the unbroken included angle 52 of about 110° plus the unbroken included angle 54 of about 90°).

After passing through and being refracted by the lens 66, the light from the second scene then passes through and is refracted by the lenses 68, 70 and 72. The lenses 66, 68, 70 and 72 may be shown in conceptual detail only. One of ordinary skill in the art would however appreciate that the configuration of the lenses 66, 68, 70 and 72 may be of conventional kind and may be similar to a conventional wide angle lens arrangement.

Figure 4:
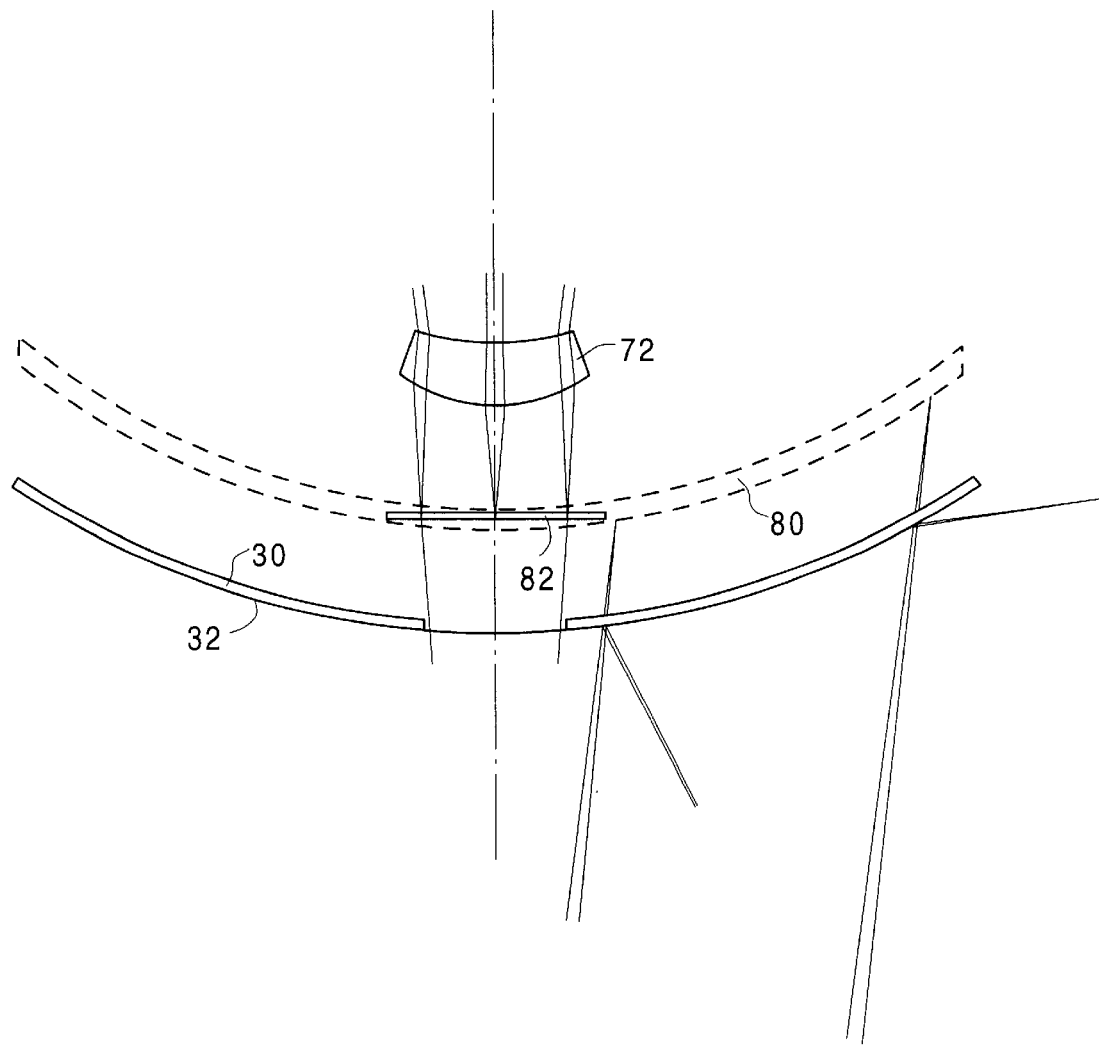
FIG. 4 is an enlarged view illustrating the positioning of a virtual image plane created by the first lens block, and a focal plane of the system of lenses.

FIG. 4 is an enlarged view illustrating in particular an area between the reflective surface 32 and the system of lenses 66, 68, 70 and 72. From a perspective below the reflective surface 32, a virtual image of the surrounding panoramic scene is may be perceived in a planar zone 80 which is located between the reflective surface 32 and the system of lenses 66, 68, 70, and 72. When light reflected by the reflective surface 32 is then further manipulated as hereinbefore described, it would be the same as if light directly from the virtual image is further manipulated.

The system of lenses 66, 68, 70 and 72 is configured so as to project and focus light from the second scene on a virtual planar zone 82 which coincides with, or is located within the planar zone 80 of the virtual image. Although the zone 82 is shown as being flat, it should be understood that it may be curved, perhaps to conform with the zone 80 of the virtual image of the surrounding panoramic scene. The light from the second scene is then further refracted and further manipulated together with and in a similar manner to light reflected from the reflective surface 32, thus facilitating eventual focusing of light from both the first, surrounding panoramic scene and from the second scene.

Referring again to FIG. 3, an opening 84 is formed in the reflective material 30, forming the reflective surface 32, through which light, after leaving the lens 72, may pass into the transparent lens 24. The light from the second scene then passes through the transparent lens 24 and the second lens block 20 and exits the second lens block 20 through the lower surface 60 thereof.

The light from the second scene then passes through the respective sets of lenses 44, 46, and 48 together with light from the first, surrounding panoramic scene. Light requiring more correction for astigmatism or other aberrations generally passes through edge regions of the sets of lenses 44, 46 and 48 and light requiring less correction generally passes through central regions of the sets of lenses 44, 46 and 48. For example, light from the angle 56 above the horizon requires more correction after being reflected from the reflective surface 32 than light from the angle 54 below the horizon, and accordingly passes through the sets of lenses 44, 46 and 48 further towards the edges thereof than light from the angle 54 below the horizon. Light coming from the system of lenses 66, 68, 70 and 72 may also require less correction than light reflected from the reflective surface 32, and accordingly passes through central regions of the sets of all lenses 44, 46 and 48 with correspondingly less correction of aberrations. Light from the second scene is then focused on the image capturing apparatus 40 together with light from the first, surrounding panoramic scene.

Figure 5:
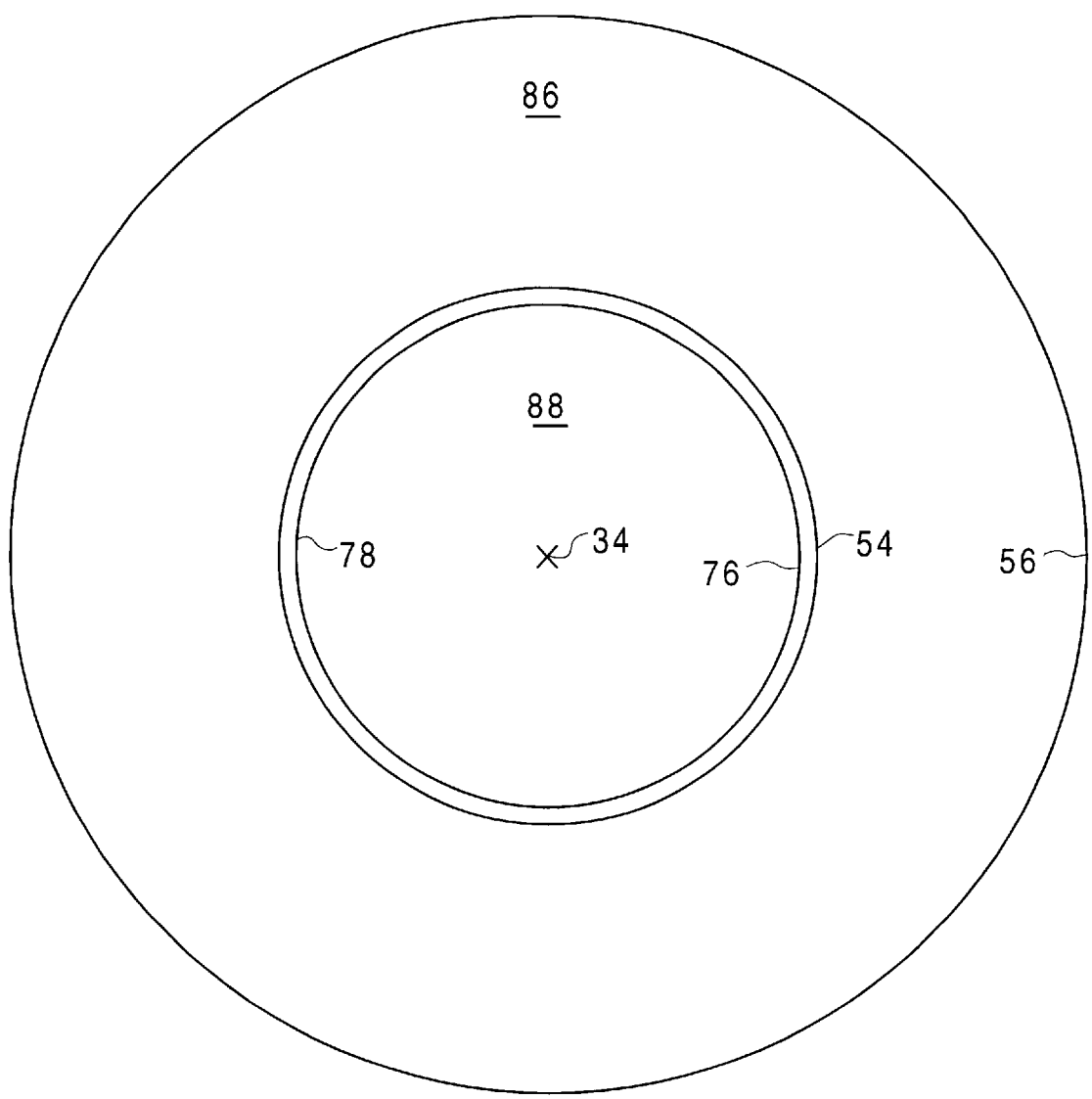
FIG. 5 is a view illustrating how of light is focused on image capturing apparatus forming part of the panoramic imaging arrangement.

FIG. 5 illustrates the manner in which light from the first, surrounding panoramic scene and the second scene is focused on the image capturing apparatus 40. Light from the first, surrounding panoramic scene focuses on an outer ring 86 with an inner edge of the ring 86 corresponding to the angle 54 located about 55° below the horizon and an outer edge of the ring 84 corresponding to the angle 56 located about 45° above the horizon. Light from the second scene focuses on a circle 88 located within the ring 86 with an outer edge of the circle 88 corresponding to the angles 76 and 78 located about 45° below vertical and a center of the circle corresponding to vertical.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A panoramic imaging arrangement comprising:
   a lens block having a substantially vertical axis of revolution and capable of receiving light from a first 360° surrounding panoramic scene;
   a system of lenses having a vertical axis of revolution substantially coinciding with the axis of revolution of the lens block and positioned to receive light from a second scene, which is at least partially located above the surrounding panoramic scene, the system of lenses projecting light from the second scene; and
   wherein the lens block has a convex lower surface through which light from the first, surrounding panoramic scene enters the lens block, the convex lower surface forming a refractive lens.

2. A panoramic imaging arrangement of claim 1 wherein the lens block has a convex upper reflective surface from which light from the first, surrounding panoramic scene is downwardly reflected.

3. A panoramic imaging arrangement of claim 2 wherein an opening is formed in the convex upper reflective surface through which light from the second scene passes after leaving the system of lenses.

4. A panoramic imaging arrangement of claim 3 wherein the system of lenses focuses light from the second scene on a plane which substantially coincides with a virtual image plane of the reflective surface located behind the reflective surface.

5. A panoramic imaging arrangement of claim 1 wherein the lens block includes a reflective surface and the system of lenses focuses light from the second scene on a plane which substantially coincides with a virtual image of the reflective surface located behind the reflective surface.

6. A panoramic imaging arrangement of claim 1 wherein light from the second scene passes through the lens block after leaving the system of lenses.

7. A panoramic imaging arrangement of claim 1 wherein the system of lenses receives light from the second scene for an unbroken included angle, in a plane of the axis of revolution which is at least 60°.

8. A panoramic imaging arrangement of claim 1 wherein the lens block receives light from the first, surrounding panoramic scene for an unbroken included angle in a plane of the axis of revolution which is at least 60°.

9. A panoramic imaging arrangement of claim 1 wherein the lens block receives light from the first, surrounding panoramic scene for an unbroken included angle in a plane of the axis of revolution, and the system of lenses receives light from the second scene for an unbroken included angle, in the plane of the axis of revolution, wherein twice the unbroken included angle received by the lens block and the unbroken included angle received by the system of lenses amount to at least 220°.

10. A panoramic imaging arrangement of claim 1 further comprising at least one additional set of lenses through which light from both the first, surrounding panoramic scene and light from the second scene passes after leaving the lens block and the system of lenses respectively.

11. A panoramic imaging arrangement of claim 10 further comprising image capturing apparatus positioned to receive light from both the first, surrounding panoramic scene and from the second scene after passing through the additional set of lenses.

12. A panoramic imaging arrangement comprising:
   a lens block having a substantially vertical axis of revolution, the lens block comprising a transparent component having a convex lower surface through which light from a first, 360° surrounding panoramic scene enters the transparent component, and a convex upper reflective surface from which light from the first, surrounding panoramic scene is downwardly reflected after passing through the transparent component, there being formed an opening in the reflective surface; and
   a system of lenses through which light from a second scene, which is at least partially located above the first, surrounding panoramic scene, passes, whereafter the light from the second scene passes through the opening in the convex upper reflective surface and then through the transparent component.

13. A panoramic imaging arrangement of claim 12 wherein the system of lenses focuses light from the second scene on a plane which substantially coincides with a virtual image plane of the reflective surface located behind the reflective surface.

14. A panoramic imaging arrangement of claim 12 wherein the system of lenses focuses light from the second scene on a plane which substantially coincides with a virtual image of the reflective surface located behind the reflective surface.

15. A panoramic imaging arrangement of claim 12 wherein light from the second scene passes through the lens block after leaving the system of lenses.

16. A panoramic imaging arrangement of claim 12 wherein the system of lenses receives light from the second scene for an unbroken included angle, in a plane of the axis of revolution which is at least 60°.

17. A panoramic imaging arrangement of claim 12 wherein the lens block receives light from the first, surrounding panoramic scene for an unbroken included angle in a plane of the axis of revolution which is at least 60°.

18. A panoramic imaging arrangement of claim 12 wherein the lens block receives light from the first, surrounding panoramic scene for an unbroken included angle in a plane of the axis of revolution, and the system of lenses receives light from the second scene for an unbroken included angle, in the plane of the axis of revolution, wherein twice the unbroken included angle received by the lens block and the unbroken included angle received by the system of lenses amount to at least 220°.

19. A panoramic imaging arrangement of claim 12 further comprising at least one additional set of lenses through which light from both the first, surrounding panoramic scene and light from the second scene passes after leaving the lens block and the system of lenses respectively.

20. A panoramic imaging arrangement of claim 19 further comprising image capturing-apparatus positioned to receive light from both the first, surrounding panoramic scene and from the second scene after passing through the additional set of lenses.

* * * * *